United States Patent [19]

Vuichard

[11] Patent Number: 4,725,704
[45] Date of Patent: Feb. 16, 1988

[54] TRAVELLING WIRE AND CAVITY SINKING EDM APPARATUS

[75] Inventor: Michel Vuichard, Valleiry, France

[73] Assignee: Charmilles Technologies S.A., Geneva, Switzerland

[21] Appl. No.: 774,317

[22] Filed: Sep. 10, 1985

[30] Foreign Application Priority Data

Sep. 11, 1984 [CH] Switzerland ............... 4342/84

[51] Int. Cl.[4] .................. B23H 7/02; B23H 7/26
[52] U.S. Cl. ..................... 219/69 W; 219/69 R
[58] Field of Search ............ 219/69 W, 69 E, 69 M, 219/69 R; 204/206, 224 M

[56] References Cited

U.S. PATENT DOCUMENTS

| 3,122,628 | 2/1964 | Inoue | 219/69 V |
| 3,731,044 | 5/1973 | Ullmann et al. | 219/69 W |
| 4,307,279 | 12/1981 | Inoue et al. | 219/69 W |
| 4,355,223 | 10/1982 | Inoue et al. | 219/69 W |
| 4,544,819 | 10/1985 | Nomura et al. | 219/69 M |
| 4,547,646 | 10/1985 | Briffod | 219/69 W |
| 4,596,066 | 6/1986 | Inoue | 219/69 M |

FOREIGN PATENT DOCUMENTS

| 3409775 | 9/1984 | Fed. Rep. of Germany . | |
| 53-63697 | 6/1978 | Japan | 219/69 W |
| 55-48529 | 4/1980 | Japan | 219/69 W |
| 56-15930 | 2/1981 | Japan . | |
| 56-45324 | 4/1981 | Japan | 219/69 W |
| 163833 | 12/1981 | Japan | 219/69 W |
| 194828 | 11/1982 | Japan . | |
| 58-10423 | 1/1983 | Japan | 219/68 |
| 58-51018 | 3/1983 | Japan | 219/69 M |
| 58-56729 | 4/1983 | Japan | 219/69 M |

Primary Examiner—Philip H. Leung
Assistant Examiner—Geoffrey S. Evans
Attorney, Agent, or Firm—Gifford, Groh, VanOphem, Sheridan, Sprinkle and Dolgorukov

[57] ABSTRACT

An EDM apparatus having a first support member for the workpiece and a second support member for the guide members of an electrode wire. A cross-slide provides relative linear motions between the two support members for effecting a cut in the workpiece by the electrode wire. A third support member carrying a form electrode tool is arranged to be selectively held stationary either relative to the first support member, by an appropriate first coupling member, or relative to the second support member, by a second coupling member. Under the first condition, the cross-slide provides the necessary relative linear displacements between the electrode wire and the form electrode tool for cutting the electrode tool by the electrode wire and, under the second condition, the same cross-slide provides the necessary displacements for sinking the electrode tool into the workpiece.

13 Claims, 2 Drawing Figures

TRAVELLING WIRE AND CAVITY SINKING EDM APPARATUS

BACKGROUND OF THE INVENTION

The present invention relates to a compound EDM apparatus having the capability of effecting travelling wire cutting operations and cavity sinking or shaping operations. Among the diverse methods available for machining a workpiece by electrical discharges, travelling wire cutting of a workpiece tends today to take the lead over cavity sinking machining by means of a shaping massive electrode tool. One of the reasons is due principally to the fact that travelling wire EDM machining is effected at a relatively low cost by an electrode tool, in the form of a wire, whose size has no influence upon the accuracy of machining. EDM die sinking, or cavity sinking, by contrast, requires an expensive and massive electrode tool that, in addition, must be periodically replaced or rectified, because of the unavoidable wear to which it is subjected, which in turn necessarily reduces the machining accuracy, whatever the precautions taken to control the wear of the electrode tool and the accuracy of machining. There results a tendency for the user of EDM apparatus to emphasize travelling wire cutting operations as much as possible, which obviously results in a limitation of workpiece shapes which can be obtained. However, a great number of diverse workpiece shapes could be obtained economically by travelling wire cutting of the workpiece followed by an additional cavity sinking or shaping permitting to machine particular areas of the workpiece with a specific shape, for example for forming recesses which can not be achieved by means of an electrode wire. As the massive electrode tool used in sinking operations can often be made by EDM wire cutting, a great number of machining operations, including the machining of the massive cavity sinking electrode tool could be entirely effected by means of two EDM apparatus, one of the travelling wire type which is used both for making the massive die or cavity sinking electrode tools and for effecting a preliminary cut in workpieces by means of the electrode wire, while the other EDM apparatus is of the die or cavity sinking type and is used for finish machining operations on the workpiece having been roughly cut on the first EDM machine, the electrode tool used on the second machine having also been machined on the first EDM machine.

One of the most expensive parts of a precision EDM machine, whether it is a travelling wire EDM machine or a cavity sinking machine, is the mechanical assembly permitting to effectuate with high accuracy the controlled displacement of the electrode wire or of the massive shaping electrode tool, as the case may be, relative to the workpiece. For some applications, it would therefore be advantageous to utilize the same mechanical assembly providing such relative displacement for the three types of machining mentioned above, namely machining of the massive form electrode tool for die or cavity sinking, effecting the preliminary cut in the workpiece, and effecting the finish machining of the workpiece by shaping or sinking by the massive form electrode tool.

SUMMARY OF THE INVENTION

The present invention provides an EDM apparatus capable of accomplishing such an object of effecting three different types of machining, utilizing nevertheless a single mechanical assembly providing the relative motions between the machining electrodes and the workpiece in the course of the three types of machining. As the controlling unit for the assembly providing the relative motions is often a microprocessor, the same machine control can be used while shifting from one type of machining to another, as only the software, or program, need be changed according to the type of machining operation in use. There results a considerable cost saving through the use of a single apparatus having a single motion-providing mechanical assembly and a single machine control.

The many objects and advantages of the present invention will become apparent to those skilled in the art when the following description of examples of structure for practicing the invention is read in conjunction with the accompanying drawing wherein:

DETAILED DESCRIPTION OF THE PREFERRED EMBODIMENTS

Figure 1:
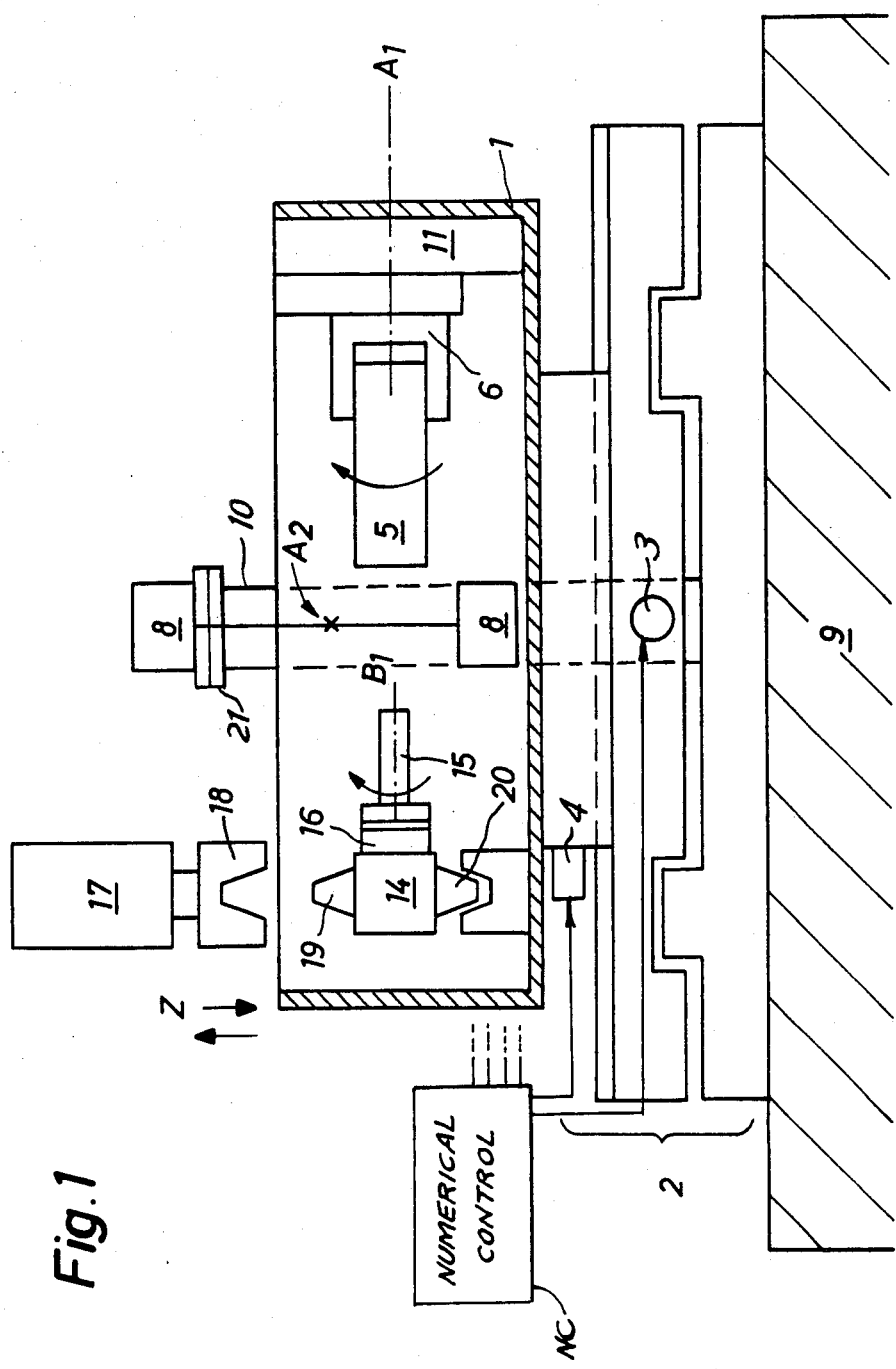
FIG. 1 is a schematic representation of an example of structure according to the present invention.

Referring to FIG. 1, there is schematically illustrated an EDM apparatus having a tank designated by reference numeral 1 in which machining by electrical discharges, or electro-erosion machining, is effected. The tank 1 is displaceable along two orthogonal axes, one axis, the X-axis for example, being parallel to the plane of the drawing, and the other axis, the Y-axis, being perpendicular to the X-axis, namely being perpendicular to the plane of the drawing. The tank 1 is displaceable along the X-axis and the Y-axis relative to the base or frame 9 of the EDM apparatus, by means of a cross-slide table 2 supporting the tank 1. The linear displacements along the two axes are obtained by means of servo motors 3 and 4, respectively, controlled by appropriate electrical control circuits, not shown specifically but forming part of the machine numerical control NC.

The workpiece 5 is held stationary against linear motion relative to the movable portion of the cross-slide table 2 by means of a vise 6. The vise 6 is preferably held orientable about an axis $A_1$ parallel to the cross-slide table 2 by a first support member 11 which is mounted stationary in the tank 1, i.e. mounted on the top of the cross-slide table 2. An electrode wire 7 is stretched, and longitudinally travels, between two guide members 8 on the end of horizontally extending arms, not shown, affixed to a second support member 10 fixedly supported by the machine frame or base 9. The second support member 10 which carries the wire guide members 8 is preferably rotatable around an axis $A_2$ perpendicular to the axis $A_1$ and parallel to the top of the cross-slide table 2, such as to permit the electrode wire 7 to be inclined in any direction relative to the workpiece 5. Rotations of the support members 10 and 11 around the axes $A_1$ and $A_2$, as well as the linear motions of the tank 1 along the X-axis and Y-axis are controlled, in a well known manner, by appropriate electronic control circuits, not shown, and it will be readily appreciated that all the elements heretofore described permit to cut by electrical discharges the workpiece 5 by means of the electrode wire 7.

A coupling member 13, stationary relative to the top of the cross-slide table 2, removably supports through the intermediary of a complementary member 20, which which it can be locked, a third support member 14 to which is attached a massive die or cavity sinking form electrode tool 15. Preferably, the massive electrode tool 15 is supported from the support member 14 through the intermediary of a rotary head 16 which enables the electrode tool 15 to rotate relative to the support member 14 around an axis $B_1$ parallel to the axis $A_1$. In the position illustrated at FIG. 1, i.e. when the support member 14 is attached to the coupling member 13, linear motions along the X-axis and Y-axis of the cross-slide table 2 displace the massive electrode tool 15 relative to the electrode wire 7, and thus permit cutting of the massive electrode tool 15 by the electrode wire 7. In this manner, a massive electrode tool may be shaped, entirely or in part, by means of an electrode wire.

It will be appreciated that the electrode wire 7 can be inclined, by means well known in the art, relative to the workpiece 5. For example, the workpiece 5 may be held stationary in and by the vise 6 while a cross-slide table 21 disposed between the wire guide support member 10 and the arms supporting the wire top guide member 8, or between the support arm and the wire top guide member, is capable of displacing the wire top guide member 8 such as to incline the wire 7 in all directions, without the necessity of accomplishing rotations around the axis $A_1$ and $A_2$. As long as the desired inclinations of the electrode wire 7 are below a predetermined angle value, such an arrangement may be more economical than providing rotation of the workpiece 5 around the axis $A_1$ or rotation of the electrode wire 7 around the axis of rotation $A_2$.

A housing 17 fixedly supported from the machine frame or base 9 supports a second coupling member linearly movable along a Z-axis perpendicular to the top of the cross-slide table 2. The second coupling member 18 is adapted to engage with a complementary locking member 19 on the support member 14 of the massive electrode tool 15. In the position illustrated at FIG. 1, a downward linear displacment along the Z-axis of the second coupling member 18 causes the coupling member 18 to engage the complementary locking member 19. After locking of the two complementary coupling members and unlocking of the first coupling member 13, the second coupling member 18 can be retracted upwardly for disengaging the electrode tool support member 14 from the first coupling member 13, and for subsequently holding the electrode tool 15 in a predetermined position along the Z-axis relative to the housing 17, and consequently relative to the machine frame or base 9. In such a position, linear motions of the cross-slide table 2 along the X-axis or the Y-axis cause relative displacement of the electrode tool 15 relative to the workpiece 5, thus permitting to machine the workpiece 5 by feeding the massive electrode tool 15 into the workpiece 5 by means of the same cross-slide table 2 which also provides the displacement of the electrode wire 7 relative to the workpiece 5 for cutting the workpiece 5, and also for cutting the electrode tool 15 by the electrode wire 7.

In the event, which often occurs, that the electrode tool to be shaped by means of the electrode wire 7 is a punch or a die which is obtained by cutting a plate with the electrode wire 7, it is advantageous to support the plate to be machined such that it can be rotated around two perpendicular axes parallel to the axes $A_1$ and $A_2$ respectively. For the sake of simplifying the drawing, and because the elements required for accomplishing such results are well known in the art, they are not shown at FIG. 1, but it is clear that such, support members could be disposed in the tank 1, in the stead of, or in addition to, the support member 11.

It is evident that if machining of a massive electrode tool of a particular shape cannot be acomplished exclusively by electrode wire cutting, it is possible to shape the electrode tool by forming in an operation similar to cavity sinking, either by maintaining the massive electrode tool to be shaped on the tool holder 14 and by mounting on the support member 11 another massive electrode tool adapted to form the first electrode tool, or by shifting the position of the two electrode tools. It is also evident that all the linear motions and rotary motions are generally controlled by appropriate electrical or electronic circuits, or by a numerical NC control or a microprocessor, as well known in the art, and that it is not necessary to describe such installations in detail as they are well known.

Figure 2:
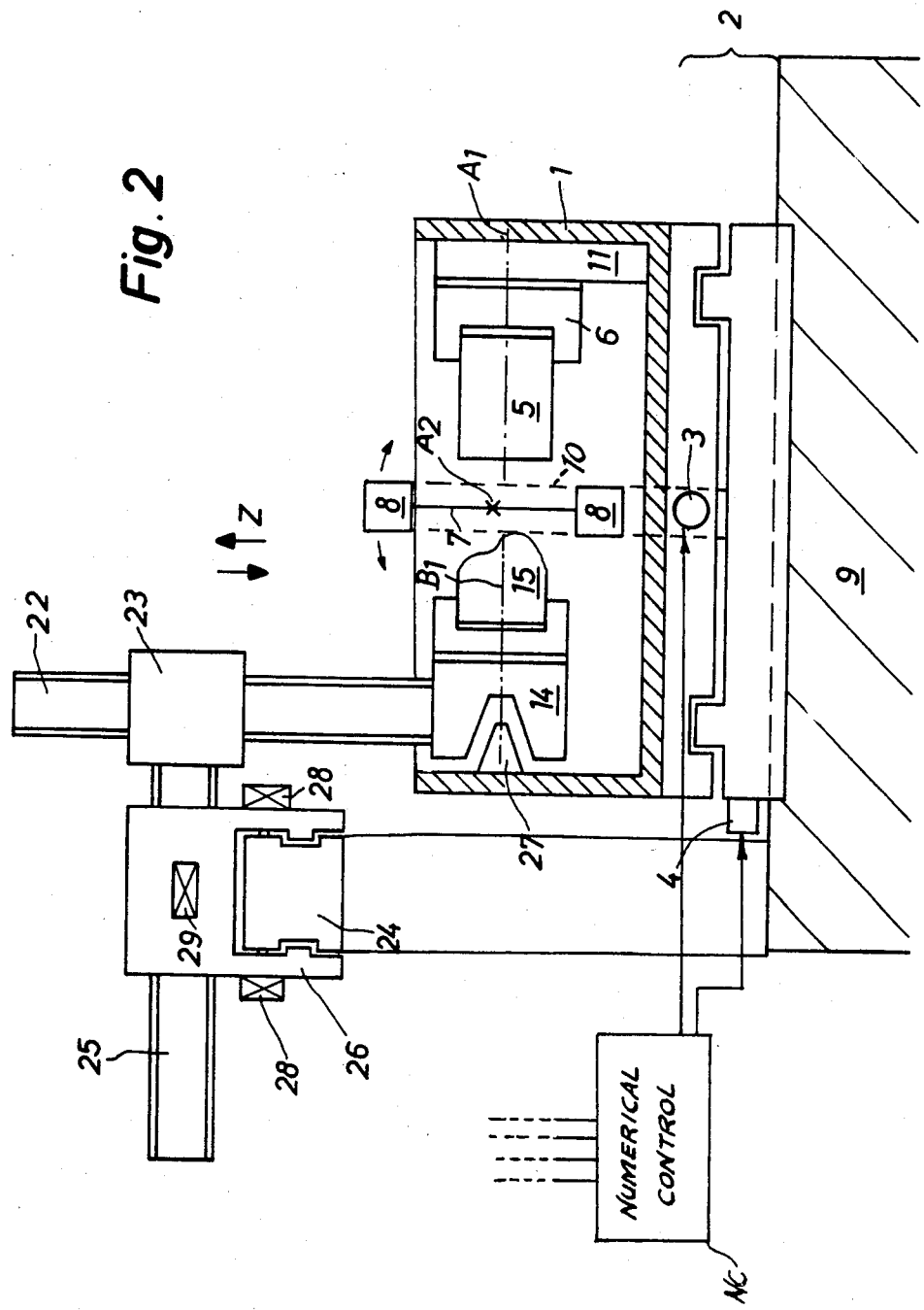
FIG. 2 is a schematic representation of an alternative structure according to the invention.

FIG. 2 schematically illustrates another embodiment of the invention wherein the means for coupling the tool holder 14 alternatively to one or another of two supports is substantially different from the structure of FIG. 1.

All the elements of FIG. 2 which are the same or which have a function analog to that of FIG. 1 are identified by the same reference numerals, and the following description is addressed only to the differences between the two embodiments.

In the structure of FIG. 2, the tool holder or support 14 is mounted on the end of a slide 22 linearly movable relative to a housing 23 in a direction perpendicular to the plane of the motions provided by the cross-slide table 2. The housing 23 is linearly movable relative to a support block 24 attached to the machine frame or table 9, the support block 24 being provided with cross-slides 25 and 26 which define a second cross-slide arrangement for displacement in directions which are parallel to the directions of displacement provided by the cross-slide table 2. The tool support or holder 14 is arranged such as to be capable of being coupled to a complementary locking member 27, in a similar manner as the arrangement providing coupling between the members 13 and 20 of FIG. 1. In addition, the linear displacements of the housing 23 can be prevented in the two linear directions by appropriate brakes 28 and 29, when the tool holder or support 14 is unlocked such as to allow machining of the workpiece 5 by means of the massive electrode tool 15. When machining the electrode tool 15 by means of the electrode wire 7 the tool support or holder 14 is affixed to the tank 2 through the intermediary of the complementary locking member 27 and the brakes 28 and 29 are released such as to allow the displacements of the massive electrode tool 15 to be effected by the cross-slide table 2 driven by the servo motors 3 and 4. By means of such an arrangement, as in the structure of FIG. 1, the accuracy of machining is entirely dependent upon the accuracy of the cross-slide table 2. In order to achieve complete freedom in all directions, the embodiment of FIG. 2 also comprises the same axes of rotation $A_1$, $A_2$ and $B_1$ as the structure of FIG. 1.

Machining of the workpiece 5 by the massive electrode tool 15 can also be effected by maintaining the tank 1 stationary and controlling the linear displacements of the slide 22 and housing 23 by appropriate servo motors, not shown, and appropriate switches connecting the servo motors to the machine numerical control NC. Under such conditions, the coupling and locking members 14 and 27 can be omitted.

It is also possible to control, by appropriate servo motors, the vertical linear motion of the tool support or holder 14 in the structures of FIGS. 1 and 2 such as to add one more dimension to the machining capability of the massive electrode tool 15.

In both structures illustrated in the drawing, the guide members 8 of the electrode wire 7 are stationary and the tank 1 in which the workpiece 5 is mounted is displaceable along two crossed axes. The invention can also provide a different arrangement, for example for displacing the electrode wire 7 in one direction and the workpiece 5 in another direction, or for displacing only the electrode wire 7 in the two crossed directions.

The inclination of the electrode wire 7 relative to the workpiece 5 around the axes of rotation $A_1$ and $A_2$ can also be obtained, as previously mentioned, by displacing one of the electrode wire guide members 8 relative to the other.

Furthermore, the coupling means 18 shown at FIG. 1 could be provided with a servo motor, not shown, adapted to displace vertically the upper guide member 8 of the electrode wire 7, such as to adjust the distance between the two electrode wire guide members 8 in proportion to the thickness of the workpiece 5. The same servo motor can also be used during machining of the workpiece 5 by the electrode tool 15 with the coupling members 18 and 19 mutually engaged.

Having thus disclosed the present invention by way of examples of structure given for illustrative purpose only, modifications whereof will be apparent to those skilled in the art, what is claimed as new is as follows:

1. An EDM apparatus comprising a first support member supporting a workpiece, a second support member supporting a pair of guide members for an electrode wire travelling longitudinally between the guide members, means for controllably linearly displacing one of said support members relative to the other along an X-axis and a Y-axis for effecting a cut in the workpiece by means of the electrode wire, a third support member with a tool holder for a solid electrode and means for selectively coupling the displacements of said third support member either with the displacements of said first support member or with the displacements of said second support member, means for selectively activating said controllable linear displacing means to selectively machine both said solid electrode by means of said electrode wire and said workpiece by means of said solid electrode in a tank.

2. The EDM apparatus of claim 1 wherein means are provided for consecutively controlling electrical discharge machining operations requiring displacement of one of said support members relative to at least one of the two other support members followed by displacement of one of said two other support members relative to the other.

3. The EDM apparatus of claim 1 further comprising means for rotating at least one of said support members around an axis parallel to a plane defined by the X-axis and Y-axis.

4. The EDM apparatus of claim 1 further comprising means for linearly displacing said third support member relative to at least one of said first and second support members along an axis perpendicular to a plane defined by the X-axis and Y-axis.

5. The EDM apparatus of claim 1 wherein the third support member comprises a pair of slides enabling free displacement of the third support member relative to the second support member in parallel to a plane defined by the X-axis and Y-axis, said slides being provided with braking means for preventing such displacement, and wherein coupling means are provided for immobilizing said third support member relative to said first support member for causing said third support member to be displaced by said first support member relative to said second support member when said braking means are released.

6. The EDM apparatus of claim 4 wherein means are provided for consecutively controlling electrical discharge machining operations requiring displacement of one of said support members relative to at least one of the two other support members followed by displacement of one of said two other support members relative to the other.

7. The EDM apparatus of claim 5 wherein means are provided for consecutively controlling electrical discharge machining operations requiring displacement of one of said support members relative to at least one of the two other support members followed by displacement of one of said two other support members relative to the other.

8. The EDM apparatus of claim 1 further comprising means for linearly displacing said third support member relative to at least one of said first and second support members along an axis perpendicular to a plane defined by the X-axis and the Y-axis.

9. The EDM apparatus of claim 3 further comprising means for linearly displacing said third support member relative to at least one of said first and second support members along an axis perpendicular to a plane defined by the X-axis and the Y-axis.

10. The EDM apparatus of claim 1 wherein the third support member is connected to the second support member through a pair of slides enabling free displacement of the third support member relative to the second support member in parallel to a plane defined by the X-axis and Y-axis, said slides being provided with braking means for preventing such displacement, and wherein coupling means are provided for immobilizing said third support member relative to said first support member for causing said third support member to be displaced by said first support member relative to said second support member when said braking means are released.

11. The EDM apparatus of claim 3 wherein the third support member is connected to the second support member through a pair of slides enabling free displacement of the third support member relative to the second support member in parallel to a plane defined by the X-axis and Y-axis, said slides being provided with braking means for preventing such displacement, and wherein coupling means are provided for immobilizing said third support member relative to said first support member for causing said third support member to be displaced by said first support member relative to said second support member when said braking means are released.

12. The EDM apparatus of claim 4 wherein the third support member is connected to the second support member through a pair of slides enabling free displacement of the third support member relative to the second support member in parallel to a plane defined by the X-axis and Y-axis, said slides being provided with braking means for preventing such displacement, and wherein coupling means are provided for immobilizing said third support member relative to said first support member for causing said third support member to be displaced by said first support member relative to said second support member when said braking means are released.

13. The EDM apparatus of claim 3 wherein means are provided for consecutively controlling electrical discharge machining operations requiring displacement of one of said support members relative to at least one of the two other support members followed by displacement of one of said two other support members relative to the other.

* * * * *